(12) United States Patent
Buri et al.

(10) Patent No.: US 9,574,088 B2
(45) Date of Patent: Feb. 21, 2017

(54) PROCESS TO DISPERSE AND / OR GRIND AND / OR CONCENTRATE CALCIUM CARBONATE IN AQUEOUS MEDIA USING AN AQUEOUS SOLUTION CONTAINING ZIRCONIUM COMPOUNDS

(75) Inventors: Mathias Buri, Rothrist (CH); Joachim Schoelkopf, Killwangen (CH); Michael Kaessberger, Sempach (CH)

(73) Assignee: Omya International AG, Oftringen (CH)

( * ) Notice: Subject to any disclaimer, the term of this patent is extended or adjusted under 35 U.S.C. 154(b) by 129 days.

(21) Appl. No.: 13/066,375

(22) Filed: Apr. 13, 2011

(65) Prior Publication Data

US 2011/0192323 A1 Aug. 11, 2011

Related U.S. Application Data

(62) Division of application No. 11/988,622, filed as application No. PCT/IB2006/001945 on Jul. 11, 2006, now Pat. No. 8,845,804.

(30) Foreign Application Priority Data

Jul. 25, 2005 (EP) .................................... 05076705

(51) Int. Cl.
C08K 3/00 (2006.01)
C09C 3/04 (2006.01)
C09C 1/02 (2006.01)

(52) U.S. Cl.
CPC .............. *C09C 3/041* (2013.01); *C09C 1/021* (2013.01); *C01P 2006/62* (2013.01); *C01P 2006/82* (2013.01)

(58) Field of Classification Search
USPC ........................................................ 106/450
See application file for complete search history.

(56) References Cited

U.S. PATENT DOCUMENTS

| | | | |
|---|---|---|---|
| 2,919,205 A | 12/1959 | Hart | |
| 3,029,153 A | 4/1962 | Hackley | |
| 3,333,980 A * | 8/1967 | McCord | 106/450 |
| 3,597,251 A | 8/1971 | Kaufman et al. | |
| 3,904,130 A | 9/1975 | Delfosse et al. | |
| 4,061,720 A | 12/1977 | Phillips | |
| 4,640,716 A | 2/1987 | Cleland | |
| 5,043,017 A | 8/1991 | Passaretti | |
| 5,076,846 A | 12/1991 | Buri et al. | |
| 5,156,719 A | 10/1992 | Passaretti | |
| 5,217,791 A | 6/1993 | Fujita et al. | |
| 5,362,573 A | 11/1994 | Pandian et al. | |
| 5,755,870 A * | 5/1998 | Ravishankar | 106/450 |
| 5,824,145 A | 10/1998 | Marganski et al. | |
| 6,140,376 A | 10/2000 | Golley et al. | |
| 6,228,161 B1 | 5/2001 | Drummond | |
| 6,254,724 B1 | 7/2001 | Seltzer et al. | |
| 6,767,973 B2 | 7/2004 | Suau et al. | |
| 6,858,255 B2 | 2/2005 | Deckers et al. | |
| 7,033,428 B2 | 4/2006 | Drummond | |
| 2002/0148582 A1 | 10/2002 | Drummond | |
| 2006/0009560 A1 | 1/2006 | Gane et al. | |
| 2006/0100525 A1 | 5/2006 | Katura et al. | |
| 2006/0142498 A1 * | 6/2006 | Gane et al. | 525/242 |
| 2006/0162884 A1 | 7/2006 | Gane et al. | |
| 2006/0292323 A1 | 12/2006 | Hutchinson et al. | |
| 2008/0022901 A1 | 1/2008 | Buri et al. | |
| 2009/0301351 A1 * | 12/2009 | Buri et al. | 106/450 |
| 2011/0192323 A1 | 8/2011 | Buri et al. | |
| 2012/0289639 A1 | 11/2012 | Buri et al. | |

FOREIGN PATENT DOCUMENTS

| | | |
|---|---|---|
| CN | 1359986 | 7/2002 |
| EP | 0100947 A1 | 2/1984 |
| EP | 0127388 A1 | 5/1984 |
| EP | 0129329 A2 | 12/1984 |
| EP | 0206837 A2 | 12/1986 |
| EP | 0445952 A1 | 9/1991 |
| EP | 0542644 A1 | 5/1993 |
| EP | 0850685 A2 | 1/1998 |
| EP | 2070991 A1 | 6/2009 |
| FR | 2603042 A1 | 8/1988 |
| FR | 2852600 A1 | 9/2004 |
| GB | 1373634 A * | 11/1974 |

(Continued)

OTHER PUBLICATIONS

A. S. Jonsson et al. "Treatment of Paper Coating Colour Effluents by Membrane Filtration" Elsevier Science B.V., Desalination, vol. 105, Issue 3, Jul. 1996, pp. 263-276.*
I. McAlpine, "Zirconium Carbonate, An Alternative Insolubilizer for Coating Binders", TAPPI 1982 Coating Conference, pp. 165-179.*
The European Search Report dated Sep. 14, 2005 for European Application No. EP 05 07 6705.
The International Search Report for PCT Application No. PCT/IB/001945, dated Jul. 5, 2007.
The Written Opinion of the International Searching Authority for PCT Application No. PCT/IB/001945.
The International Preliminary Report on Patentability dated Jan. 8, 2008 for PCT Application No. PCT/IB/001945.
Material Safety Data Sheet of AZCOTE 5800M® by Eka Chemicals Inc. issued Mar. 5, 2001.

(Continued)

*Primary Examiner* — Kaj K Olsen
*Assistant Examiner* — Ross J Christie
(74) *Attorney, Agent, or Firm* — Amster, Rothstein & Ebenstein LLP

(57) ABSTRACT

The present invention is directed to an aqueous suspension and/or aqueous dispersion of calcium carbonate obtained by the process of manufacturing a calcium carbonate-containing slurry prepared by addition of one or more zirconium compounds, wherein the aqueous suspension and/or aqueous dispersion of calcium carbonate consists essentially of calcium carbonate, water, one or more zirconium compounds and optionally, one or more phosphate-free additives acting as dispersion and/or grinding aid agents.

22 Claims, No Drawings

(56) References Cited

FOREIGN PATENT DOCUMENTS

| | | |
|---|---|---|
| JP | 09302142 | 11/1997 |
| JP | 2001063209 A | 3/2001 |
| JP | 20040306319 A | 11/2004 |
| RU | 2179607 C2 | 2/2002 |
| SU | 1198001 A1 | 12/1985 |
| WO | 9820079 A1 | 5/1998 |
| WO | WO 00/39222 | 7/2000 |
| WO | 0148093 A1 | 7/2001 |
| WO | 2005121257 A2 | 12/2005 |

OTHER PUBLICATIONS

Office Action dated Jul. 2, 2009 for European Application No. EP1957587.
Office Action dated Sep. 27, 2012 for European Application No. EP1957587.
Office Action dated Apr. 14, 2015 for European Application No. EP1957587.
Office Action dated Mar. 16, 2016 for U.S. Appl. No. 13/559,898.

* cited by examiner

PROCESS TO DISPERSE AND / OR GRIND AND / OR CONCENTRATE CALCIUM CARBONATE IN AQUEOUS MEDIA USING AN AQUEOUS SOLUTION CONTAINING ZIRCONIUM COMPOUNDS

CROSS-REFERENCE TO RELATED APPLICATIONS

This is a divisional of U.S. application Ser. No. 11/988,622, filed Jun. 18, 2009 now U.S. Pat. No. 8,845,804, which is a U.S. national phase of PCT Application No. PCT/IB2006/001945, filed Jul. 11, 2006, which claims priority to European Application No. 05076705.2, filed Jul. 25, 2005.

BACKGROUND OF THE INVENTION

Aqueous suspensions and/or aqueous dispersions and/or dry calcium carbonate mineral pigments of mineral matter are presently used in various applications and, especially when containing calcium carbonate as inorganic particulate material, they are notably used to produce compositions containing pigments or fillers, which can further be used in paper manufacturing and/or paper and/or plastic coatings, as fillers for plastics or in aqueous paint compositions and the like.

In order to maintain such slurries in stable form in terms of viscosity, and to avoid undesirable phenomena such as aggregation, flocculation or sedimentation during slurry manufacturing, transport or storage, the skilled man in the art knows that it is necessary to obtain stable aqueous suspensions and/or aqueous dispersions of particulate material using dispersing and/or grinding aid agents. It is also well known that the choice of such dispersing and/or grinding aid agents may later influence some of the characteristic properties of the final products made based on these slurries; for instance, in the case of aqueous paint, paper or paper coating formulations, the state of the art includes documents concerning dispersing agents that enhance the optical properties of final products, such as opacity, gloss or the scattering coefficient.

U.S. Pat. No. 5,043,017 and U.S. Pat. No. 5,156,719 deal with finely divided calcium carbonate that is acid-stabilized through the use of a calcium-chelating agent, a conjugate base, such as polyphosphates and a weak acid, the latter being preferentially phosphoric acid, and a process in order to obtain such calcium carbonate and a paper containing such calcium carbonate.

These solutions do not comply with new requirements of the skilled man in the art, in terms of non-use of certain chemicals which are now considered as potential pollutants in waste waters and process waters, namely phosphate compounds. In fact, chemical products containing phosphates are currently subject to an increasing number of restrictions. In the Spring of 2003, the European Union signed a Protocol on a Pollutant Release and Transfer Register. On Oct. 7, 2004, the European Commission adopted a proposal for a Regulation for future reporting obligations: COM (2004) 634. Annex I of this proposal lists the industrial facilities and activities under consideration: the mineral industry is mentioned on page 25 (underground mining and related operations, opencast mining). Annex II lists 90 products under consideration: on page 28 is mentioned phosphorus total.

In view of the above, the previous solutions disclosing the use of phosphates and above all of phosphoric acid can not be considered as relevant, efficient and useful for the skilled man in the art.

As known for many years in the art, another solution to obtain stable suspensions of minerals matter is to use of acrylic homopolymers and/or acrylic copolymers with other water-soluble monomers. FR 2 603 042, EP 0 100 947, EP 0 127 388, EP 0 129 329, EP 0 542 644 disclose the use of such polymers exhibiting low molecular weights for this purpose. Although these various types of dispersing agents make it possible to obtain aqueous suspensions of finely divided mineral matter that are stable over time, they do not allow the subsequent suspension or redispersion of mineral matter in water, such as notably calcium carbonate, when issued from a mechanical and/or thermal reconcentration step subsequent to a step of dry and/or wet grinding without the use of dispersant and at low concentration in terms of dry matter (<40% by dry weight), and optionally followed by an additional grinding step. Such low solid ground calcium carbonate, ground in aqueous suspension with using any dispersing and/or grinding aid agents are difficult to disperse to form high solids content suspensions.

Faced with this problem, the skilled man in the art knows WO 01 48093 that teaches the selection of homopolymers of acrylic acid and/or water soluble copolymers of acrylic acid with a high molecular weight (corresponding to viscosity indexes ranging from 0.08 to 0.80). Another solution is proposed in EP 0 850 685, which discloses the use of a water soluble copolymer of acrylic acid and maleic acid, in a certain ratio, and according to a certain molecular weight.

However, the above-mentioned polymers and copolymers are derived from petrochemicals which are well known to contribute to an undesirable increase in TOC in the atmosphere and DOC in water, and do not comply with the Kyoto Protocol, as mentioned previously herein.

Furthermore, none of these documents teach the influence of the dispersing agent used on the final properties of the aqueous formulations containing a suspension of mineral matter obtained according to these inventions and, more particularly, neither deals with the possible enhancement of optical properties of paints or paper or paper coatings manufactured using such slurries: the present invention allows the skilled man in the art to comply with the requirements of the end-user in terms of maintaining or improving the optical properties of the final products.

It is of note that such aqueous solutions containing zirconium compounds have been well known in the art for many years, especially as regards their use as crosslinking agents in aqueous coating formulations as disclosed in "Zirconium compounds find new uses in surface coatings" (Modern paint and coatings, February 1988, 4482, pp 36-39). The fact that polymeric species of zirconium can interact with the functional groups of organic polymers makes them of great interest in water-based inks and coatings where they can improve both heat resistance and scrub resistance: as mentioned in the article "Zirconium compounds in waterbased coatings" (Polymers paint colour Journal, Mar. 9, 1988, 178, 4209, pp 154-162), this is notably the case for Bacote™ 20 (AZC—ammonium zirconium carbonate) and Zirgel™ K (KZC: potassium zirconium carbonate) manufactured by Magnesium Elektron Ltd. It is also well established that some of these compounds may be used in ink-jet coating formulations, where they can influence rheological, optical and printing properties of these inks. These results are discussed relative to ZAA (zirconium carbonate) and AZC in "Influence of cationic additives on the rheological, optical, and printing properties of ink-jet coatings" (Polymers paint colour Journal, Mar. 9, 1988, 178, 4209, pp 154-162). However, all of the above documents refer to the use of zirconium compounds in aqueous formulations containing organic polymers (primarily binders which are strongly crosslinked by the above-mentioned zirconium compounds), which is entirely different from the present invention which deals with the reduction or elimination of organic polymers, more particularly polycarboxylates, used as grinding and/or dispersing aid agents in aqueous suspensions of calcium carbonate.

Finally, although they cannot be considered as being strictly within the application field of the present invention, since they do not address the requirements of the skilled man in the art entirely avoiding the use of phosphate compounds, providing stable slurries with high solids content of more than 45% by dry weight of mineral matter, possibly of more than 65% by dry weight of mineral matter, and possibly of more than 78% by dry weight of mineral matter, maintaining and/or enhancing the optical properties of the final products, and reducing the TOC value for an equal degree of calcium carbonate dispersion), the following documents are mentioned since they disclose the use of zirconium compounds in aqueous suspensions of mineral matter, free of organic polymers, and the enhancement of optical properties of final products such as paper and paper coatings.

U.S. Pat. No. 3,597,251 teaches that either zinc oxide or zirconium oxide or mixtures thereof can be used to improve the dispersion of calcium carbonate in water, thus leading to solids contents ranging from 55% to 80% by dry weight of mineral matter; however, the use of the above mentioned products is restricted to a combination with phosphate dispersants, as indicated in claim 1.

EP 0 206 837 discloses a process of preparing a clay pigment with the use of a sufficient amount of a zirconium ion source to enhance the optical properties of a substrate containing the pigment. AZC is disclosed as one of the most efficient zirconium ion sources to improve brightness, opacity and the scattering coefficient of a paper formulated according to this invention. Nevertheless, in view of the given examples, it clearly appears that, in order to obtain slurries of high solids content (higher than 60% by dry weight of mineral matter), conventional phosphate-based dispersants must be used (see example 1, p 12); the higher the concentration of AZC, the higher the optical properties, the lower the dispersibility of the mineral particles (see example 2, p 15).

Thus, the skilled man in the art obviously deduces from these documents that while zirconium compounds may be used to disperse minerals such as clay, and highly concentrated slurries may be obtained, requiring however the use of phosphate-based dispersants, the mineral's dispersability is decreased: faced with the new regulations concerning pollutants in the mining industry, this is precisely what he wants to avoid.

SUMMARY OF THE INVENTION

Thus, in order to comply with the multiple requirements of the skilled man in the art: above all, to avoid the use of phosphate-containing dispersants and to minimise the quantity of polycarboxylate-based dispersants and grinding aid agents, to obtain stable suspensions of calcium carbonate with high solids contents, and to maintain or possibly to enhance the optical properties (such as to increase opacity and/or the scattering coefficient) of final products, a new process of manufacturing such a calcium carbonate-containing slurry has surprisingly been found.

In this regard, it is an object of the present invention to provide a process of manufacturing a calcium carbonate-containing slurry wherein said calcium carbonate-containing slurry is prepared by adding one or more zirconium compounds, and possibly one or more further phosphate-free additives acting as dispersing and/or grinding aid agents.

In a particular embodiment, this process is characterized in that it is a mixing process, wherein:

calcium carbonate in a dry form and/or in the form of an aqueous dispersion or of an aqueous suspension or of an aqueous filtercake, is added to an aqueous suspension and/or an aqueous emulsion and/or an aqueous solution containing one or more zirconium compounds, and the resulting composition is mixed, possibly with one or more further phosphate-free additives acting as dispersing and/or grinding aid agents or one or more zirconium compounds in a dry form and/or in the form of an aqueous suspension and/or of an aqueous emulsion and/or of an aqueous solution, is added to an aqueous dispersion or an aqueous suspension or an aqueous filtercake of calcium carbonate, and the resulting composition is mixed, possibly with one or more further phosphate-free additives acting as dispersing and/or grinding aid agents.

In another embodiment, this process is characterized in that it is a grinding process, wherein:

calcium carbonate in a dry form and/or in the form of an aqueous dispersion or of an aqueous suspension or of an aqueous filtercake, is added to an aqueous suspension and/or an aqueous emulsion and/or an aqueous solution containing one or more zirconium compounds, and the resulting composition is ground, possibly with one or more further phosphate-free additives acting as dispersing and/or grinding aid agents or one or more zirconium compounds in a dry form and/or in the form of an aqueous suspension and/or of an aqueous emulsion and/or of an aqueous solution, is added to an aqueous dispersion or an aqueous suspension or an aqueous filtercake of calcium carbonate, and the resulting composition is ground, possibly with one or more further phosphate-free additives acting as dispersing and/or grinding aid agents.

In another embodiment, this process is characterized in that it is a dispersing process, wherein:

calcium carbonate in a dry form and/or in the form of an aqueous dispersion or of an aqueous suspension or of an aqueous filtercake, is added to an aqueous suspension and/or an aqueous emulsion and/or an aqueous solution containing one or more zirconium compounds, and the resulting composition is dispersed, possibly with one or more further phosphate-free additives acting as dispersing and/or grinding aid agents or one or more zirconium compounds in a dry form and/or in the form of an aqueous suspension and/or of an aqueous emulsion and/or of an aqueous solution, is added to an aqueous dispersion or an aqueous suspension or an aqueous filtercake of calcium carbonate, and the resulting composition is dispersed, possibly with one or more further phosphate-free additives acting as dispersing and/or grinding aid agents.

In another embodiment, this process is characterized in that it is a concentrating process, wherein:

calcium carbonate in a dry form and/or in the form of an aqueous dispersion or of an aqueous suspension or of an aqueous filtercake, is added to an aqueous suspension and/or an aqueous emulsion and/or an aqueous solution containing one or more zirconium compounds, and the resulting composition is concentrated, possibly with one or more further phosphate-free additives acting as dispersing and/or grinding aid agents or one or more zirconium compounds in a dry form and/or in the form of an aqueous suspension and/or of an aqueous emulsion and/or of an aqueous solution, is added to an aqueous dispersion or an aqueous suspension or an aqueous filtercake of calcium carbonate, and the resulting composition is concentrated, possibly with one or more further phosphate-free additives acting as dispersing and/or grinding aid agents.

In another embodiment, this process is characterized in that it is a dispersing process, wherein:

calcium carbonate in the form of a pigment cake, such as a filter-cake and/or a centrifuge cake and/or a cake obtained by a process of electro-concentration, said cake preferably having a moisture content above 20% by dry weight of mineral matter, is added to an aqueous suspension and/or an aqueous emulsion and/or an aqueous solution containing one or more zirconium compounds, and the resulting composition is dispersed, possibly with one or more further phosphate-free additives acting as dispersing and/or grinding aid agents or one or more zirconium compounds in a dry form and/or in the form of an aqueous suspension and/or of an aqueous emulsion and/or of an aqueous solution, is added to a pigment cake such as a filter-cake and/or a centrifuge cake and/or a cake obtained by a process of electro-concentration, said cake preferably having a moisture content above 20% by dry weight of mineral matter, and the resulting composition is mixed, possibly with one or more further phosphate-free additives acting as dispersing and/or grinding aid agents.

It is another object of the invention to provide a process of manufacturing a stable viscosity aqueous suspension and/or aqueous dispersion of calcium carbonate without the use of well-known phosphate dispersants, which are now suspected to be pollutants of the environment.

It is also an object of the present invention to provide a process of manufacturing a stable viscosity aqueous suspension and/or aqueous dispersion of calcium carbonate wherein the quantity of common polycarboxylates, such as polyacrylates or maleates and/or combinations thereof, is reduced when they are used as dispersants, since they are derived from petrochemicals that contribute to increase the "Total Organic Carbon" (TOC) in the atmosphere and the "Dissolved Organic Carbon" (DOC) in water. The Kyoto Protocol, signed Dec. 11, 1997, promotes the respect of the environment through stabilizing and reducing greenhouse gas emissions, mitigating climate change, and promoting sustainable development. The Kyoto Protocol recognizes the overwhelming importance of controlling and reducing greenhouse gas emissions which currently come primarily from industrial and transportation sources; the protocol further recognizes the corresponding opportunities to be gained through better management of carbon reservoirs and enhancement of carbon sinks in forestry and agriculture.

It is also an object of the invention to provide a process of manufacturing a stable viscosity aqueous suspension and/or aqueous dispersion of calcium carbonate which may exhibit a high solids content of more than 45% by dry weight of mineral matter, possibly more than 65% by dry weight of mineral matter, and possibly more than 78% by dry weight of mineral matter, or which may allow a calcium carbonate-containing slurry issued from a mechanical and/or thermal reconcentration step subsequent to at least one step of dry and/or wet grinding without the use of dispersant and at low concentration in terms of dry matter (less than 40% by dry weight of mineral matter), and optionally followed by an additional grinding step, to be concentrated to a high solids content form of more than 45% by dry weight of mineral matter, possibly more than 65% by dry weight of mineral matter, and possibly more than 78% by dry weight of mineral matter.

It is also an object of the present invention to provide a process of manufacturing such stable aqueous suspensions and/or aqueous dispersions of calcium carbonate, possibly in a high solids content form, such aqueous suspensions and/or dispersions maintaining and/or enhancing the optical properties notably maintaining and/or increasing the opacity and/or the scattering coefficient of the final product, when used in such end-user formulations.

Aqueous suspensions and/or aqueous dispersions thus obtained are also an object of the present invention.

Another object of the present invention is the dry calcium carbonate mineral pigment obtained after drying said aqueous suspensions and/or aqueous dispersions.

Another object of the present invention is the use of said aqueous suspensions and/or aqueous dispersions and/or dry calcium carbonate mineral pigments, in paper manufacturing and/or paper coatings and/or plastic coatings, as fillers for plastics or in aqueous paint compositions and the like.

A last object of the present invention is paper, plastics and paints containing such aqueous dispersions and/or aqueous suspensions and/or dry calcium carbonate mineral pigments.

DETAILED DESCRIPTION OF THE INVENTION

The process according to the invention allows for a reduction in the quantity of polycarboxylate dispersants to reach a certain Brookfield™ viscosity when used in combination with the zirconium compound. When in combination with polyacrylate dispersants, the use of zirconium compounds according to the invention leads to excellent results in terms of stability and solids content of redispersed calcium carbonate slurries, which are surprisingly equivalent to or improved beyond those obtained according to WO 01 48093 and EP 0 850 685, and leads to a reduction in DOC and the emission of fossil $CO_2$ upon dispersant decomposition relative to the slurries obtained according to the above patents.

Thus, the technical problem to be solved can be summed up as follows: The skilled man in the art must strictly avoid the use of phosphate and must reduce the quantity of polycarboxylate needed for a given degree of dispersion in aqueous suspensions and/or aqueous dispersions of mineral matter, due to more restricting regulations; furthermore, he must also develop a process in order to concentrate mineral matter; according to these regulations, he must also develop a process to redisperse calcium carbonate issued from a mechanical and/or thermal reconcentration step subsequent to at least one step of dry and/or wet grinding without the use of dispersant and at low concentration in terms of dry matter; lastly, he must comply with the requirements of the end-user and must maintain or enhance some of the optical properties of the final products, such as opacity.

In view of this technical problem, a new process of manufacturing such an aqueous suspension of calcium carbonate has been surprisingly found.

This process consists in manufacturing a calcium carbonate-containing slurry wherein said calcium carbonate-containing slurry is prepared by adding of one or more zirconium compounds, and possibly one or more further phosphate-free additives acting as dispersing and/or grinding aid agents.

In a particular embodiment, this process is characterized in that it is a mixing process, wherein:

calcium carbonate in a dry form and/or in the form of an aqueous dispersion or of an aqueous suspension or of an aqueous filtercake, is added to an aqueous suspension and/or an aqueous emulsion and/or an aqueous solution containing one or more zirconium compounds, and the resulting composition is mixed, possibly with one or more further phosphate-free additives acting as dispersing and/or grinding aid agents or one or more zirconium compounds in a dry form and/or in the form of an aqueous suspension and/or of an aqueous emulsion and/or of an aqueous solution, is added to an aqueous dispersion or an aqueous suspension or an aqueous filtercake of calcium carbonate, and the resulting composition is mixed, possibly with one or more further phosphate-free additives acting as dispersing and/or grinding aid agents.

In another embodiment, this process is characterized in that it is a grinding process, wherein:

calcium carbonate in a dry form and/or in the form of an aqueous dispersion or of an aqueous suspension or of an aqueous filtercake, is added to an aqueous suspension and/or an aqueous emulsion and/or an aqueous solution containing one or more zirconium compounds, and the resulting composition is ground, possibly with one or more further phosphate-free additives acting as dispersing and/or grinding aid agents.

or one or more zirconium compounds in a dry form and/or in the form of an aqueous suspension and/or of an aqueous emulsion and/or of an aqueous solution, is added to an aqueous dispersion or an aqueous suspension or an aqueous filtercake of calcium carbonate, and the resulting composition is ground, possibly with one or more further phosphate-free additives acting as dispersing and/or grinding aid agents.

In another embodiment, this process is characterized in that it is a dispersing process, wherein:

calcium carbonate in a dry form and/or in the form of an aqueous dispersion or of an aqueous suspension or of an aqueous filtercake, is added to an aqueous suspension and/or an aqueous emulsion and/or an aqueous solution containing one or more zirconium compounds, and the resulting composition is dispersed, possibly with one or more further phosphate-free additives acting as dispersing and/or grinding aid agents.

or one or more zirconium compounds in a dry form and/or in the form of an aqueous suspension and/or of an aqueous emulsion and/or of an aqueous solution, is added to an aqueous dispersion or an aqueous suspension or an aqueous filtercake of calcium carbonate, and the resulting composition is dispersed, possibly with one or more further phosphate-free additives acting as dispersing and/or grinding aid agents.

In another embodiment, this process is characterized in that it is a concentrating process, wherein:

calcium carbonate in a dry form and/or in the form of an aqueous dispersion or of an aqueous suspension or of an aqueous filtercake, is added to an aqueous suspension and/or an aqueous emulsion and/or an aqueous solution containing one or more zirconium compounds, and the resulting composition is concentrated, possibly with one or more further phosphate-free additives acting as dispersing and/or grinding aid agents.

or one or more zirconium compounds in a dry form and/or in the form of an aqueous suspension and/or of an aqueous emulsion and/or of an aqueous solution, is added to an aqueous dispersion or an aqueous suspension or an aqueous filtercake of calcium carbonate, and the resulting composition is concentrated, possibly with one or more further phosphate-free additives acting as dispersing and/or grinding aid agents.

In another embodiment, this process is characterized in that it is a dispersing process, wherein:

calcium carbonate in the form of a pigment cake such as a filter-cake and/or a centrifuge cake and/or a cake obtained by a process of electro-concentration, said cake preferably having a moisture content above 20% by dry weight of mineral matter, is added to an aqueous suspension and/or an aqueous emulsion and/or an aqueous solution containing one or more zirconium compounds, and the resulting composition is dispersed, possibly with one or more further phosphate-free additives acting as dispersing and/or grinding aid agents or one or more zirconium compounds in a dry form and/or in the form of an aqueous suspension and/or of an aqueous emulsion and/or of an aqueous solution, is mixed with a pigment cake such as a filter-cake and/or a centrifuge cake and/or a cake obtained by a process of electro-concentration, said cake preferably having a moisture content above 20% by dry weight of mineral matter, and the resulting composition is mixed, possibly with one or more further phosphate-free additives acting as dispersing and/or grinding aid agents.

It is to be noted that the thus obtained aqueous suspensions may be further upconcentrated by means well known to the skilled man in the art, such as through the use of a centrifuge or evaporator, and that further quantities of calcium carbonate, in a dry form (powder) or in a slurry form (aqueous suspension) may be introduced during this stage of upconcentration.

The obtained aqueous suspensions are very stable in terms of Brookfield™ viscosity on the one hand. On the other hand, they allow the skilled man in the art to provide the final user with highly-concentrated suspensions of mineral matter that is easily pumped and flows easily, and/or to concentrate a lower solids slurries to a higher solids form (containing more than 45% by dry weight of mineral matter, possibly 65% by dry weight of mineral matter, and possibly more than 78% by dry weight of mineral matter). Furthermore, they entirely avoid the use of dispersing agents containing phosphate compounds. They also contribute to reduce the quantity of non-Kyoto compliant polycarboxylate dispersants and/or grinding aid agents when these are used in the present invention. Finally, aqueous formulations and notably paper and paper coating formulations containing such aqueous suspensions exhibit equal or enhanced optical properties, especially in terms of opacity and/or the scattering coefficient.

The process of the present invention permits one to comply with the multiple requirements of the skilled man in the art to avoid the use of phosphate-containing dispersants and to minimise the quantity of polycarboxylate-based dispersants and grinding aid agents, to obtain stable suspensions of calcium carbonate with high solids contents (containing more than 78% by dry weight of mineral matter, and/or to concentrate a low concentrated slurries of calcium carbonate in a high solids form (to more than 50% by dry weight of mineral matter, preferably to more than 65% by dry weight of mineral matter, most preferably to more than 75% by dry weight of mineral matter), and to maintain or possibly to enhance the optical properties (such as to increase opacity and/or the scattering coefficient) of final products.

Preferentially, the process according to the invention is characterized in that the zirconium compound is AZC or KZC, or mixtures thereof It is also characterized in that the zirconium compound is supplied in the form of an aqueous solution and/or suspension, containing from 0.01% to 10% by dry weight of zirconium compound, more preferably from 0.03% to 5% by dry weight of zirconium compound.

Commercial zirconium compounds can be used according to the invention. Non-limitative examples of such compounds are:
Bacote™ manufactured by MEL CHEMICALS™, of the AZC type,
Zirmel™ manufactured by MEL CHEMICALS™, of the KZC type.

The process according to the invention is also characterized in that said aqueous suspensions and/or aqueous dispersions containing calcium carbonate are issued from a mechanical and/or thermal reconcentration step subsequent to at least one step of dry and/or wet grinding without the use of dispersant and at low concentration in terms of dry matter (less than 40% by dry weight), and optionally followed by an additional grinding step.

This process is also characterized in that the obtained aqueous suspensions and/or aqueous dispersions of calcium carbonate contain more than 45% by dry weight of calcium carbonate, preferably more than 65% by dry weight, and most preferably more than 78% by dry weight.

Another object of the invention is the aqueous suspensions and/or aqueous dispersions of calcium carbonate characterized in that they are obtained through the process according to the invention.

Such aqueous suspensions and/or aqueous dispersions are characterized in that they contain one or more zirconium compounds, and possibly one or more further phosphate-free additives acting as dispersing and/or grinding aid agents.

More preferably, such aqueous suspensions and/or aqueous dispersions are characterized in that the zirconium compound is AZC or KZC, or mixtures thereof Such aqueous suspensions and/or aqueous dispersions are also characterized in that they may be issued from a mechanical and/or thermal reconcentration step subsequent to at least one step of dry and/or wet grinding without the use of dispersant and at low concentration in terms of dry matter (less than 40% by dry weight), and optionally followed by an additional grinding step.

Such aqueous suspensions and/or aqueous dispersions are also characterized in that they may contain more than 45% in dry weight of calcium carbonate, preferably more than 65% in dry weight, and most preferably more than 78% by dry weight.

Another object of the invention lies in aqueous formulations characterized in that they contain aqueous suspensions and/or dispersions of calcium carbonate according to the invention.

Another object of the present invention is the dry calcium carbonate mineral pigment obtained after drying said aqueous suspensions and/or aqueous dispersions.

Another object of the present invention is the use of said aqueous suspensions and/or aqueous dispersions and/or dry calcium carbonate mineral pigments, in paper manufacturing and/or paper and/or plastic coatings, as fillers for plastics or for aqueous paint compositions and the like.

A last object of the present invention is paper, plastics and paints containing such aqueous dispersions and/or aqueous suspensions and/or dry calcium carbonate mineral pigments.

Further examples may help the skilled man in the art to better understand the invention according to the present Application, but should not be considered as limitative.

EXAMPLES

Note: All "Brookfield™ viscosities" mentioned in the following text refer to Brookfield™ viscosities measured using equipment commercialized under the same name, at 100 rpm, with the use of modulus no 3.

Example 1

This example illustrates the use of a zirconium compound, in a process of manufacturing a calcium carbonate-containing slurry, without the use of phosphate dispersants.

More precisely, it illustrates the use of a zirconium compound, in a process of manufacturing a calcium carbonate-containing slurry by dispersing calcium carbonate in water, and then upconcentrating, without the use of phosphate dispersants.

Test No 1.

This test illustrates the invention.

450 g of a calcium carbonate powder manufactured by OMYA™ under the name Millicarb™ OG were suspended in 249 g of water.

The suspension exhibited a solids content of 64% (in dry weight of mineral matter) and a Brookfield™ viscosity equal to 1730 mPa·s.

After addition of 0.70% (in dry weight of active additive by dry weight of mineral matter) Zirmel™ 1000, which is a potassium zirconium carbonate compound manufactured by MEL CHEMICALS™, a stable suspension of calcium carbonate was obtained with a Brookfield™ viscosity equal to 40 mPa·s. No acrylate polymer nor phosphate was used or was necessary for this viscosity reduction.

The obtained suspension was then upconcentrated by means of a laboratory evaporator, with further addition of 0.39% (in dry weight of active additive by dry weight of mineral matter) Zirmel™ 1000.

The final solids content was equal to 76.0% (in dry weight of mineral matter) and the slurry exhibited a stable Brookfield™ viscosity equal to 170 mPa·s. No acrylate polymer nor phosphate was used or was necessary to reach this concentration of 76% solids at this notably low viscosity.

The above result demonstrates the dispersing action of AZC.

Example 2

This example illustrates the use of a zirconium compound, in combination with polyacrylate-type dispersants, said polyacrylate-type dispersants being added before or during the zirconium compound addition, in a process of manufacturing a calcium carbonate-containing slurry starting from a filter-cake or dry powder of calcium carbonate, and avoiding the use of phosphate to support the dispersants.

More precisely, it relates to the use of a zirconium compound in combination with polyacrylate-type dispersants, in a process to disperse and in one case to further upconcentrate a calcium carbonate filter-cake or dry powder.

Finally, it illustrates that the use of the process according to the invention produces a calcium carbonate dispersion with good stability in terms of Brookfield™ viscosity, and allows for a reduction in quantity of necessary polyacrylate dispersants at a the same solids content.

For example 2 and further examples, the Dissolved Organic Carbon (DOC) was of two dispersing agents representative of the prior art—sodium polyacrylate polymer and sodium polyacrylate/sodium maleinate copolymer—were measured and were respectively equal to 14.6% calculated on dry matter and 11.7% calculated on dry matter.

These measurements were carried out using an apparatus commercialized by the firm DR LANGE™ under the name LCK 386. The principle of the measurement is based upon a two-stage process, wherein the total inorganic carbon is first expelled with the help of a shaker, and the total organic carbon is then oxidized to carbon dioxide.

The carbon dioxide passes through a membrane into an indicator cuvette, where it causes a colour change to occur, which is evaluated with a photometer.

For example 2 and further examples, the Organic Carbon (DOC) was calculated for each test, based on the pure dispersant reference values mentioned hereabove.

Test No 2.

This test illustrates the prior art.

A calcium carbonate filter cake (Norway base marble), with a solids content of 65% by dry weight of mineral matter, and with the following granulometric characteristics (as measured by Sedigraph™ 5100):
  a medium diameter equal to 0.63 μm,
  92% by weight of the particles have a mean diameter lower than 2 μm,
  71% by weight of the particles have a mean diameter lower than 1 μm,
  11% by weight of the particles have a mean diameter lower than 0.2 μm, was dispersed using 0.70% (in dry weight of active additives by dry weight of mineral matter) of a sodium polyacrylate/sodium phosphate based dispersing agent, which is a blend of partially neutralized sodium polyacrylate (with a molecular weight $M_w$ equal to 12'000 Dalton, measured by GPC) and sodium phosphates, produced by mixing 40% sodium polyacrylate and 85% solid phosphoric acid in a ratio 2:1 in respect to active dry weight of each additive.

The obtained suspension was then upconcentrated by means of a laboratory evaporator.

The final solids content of the carbonate slurry was equal to 72.5% by dry weight of mineral matter, and the Brookfield™ viscosity measured at 100 rpm was equal to 125 mPa·s. The sodium polyacrylate content was equal to 0.47%, expressed in dry weight of polymer by dry weight of mineral matter.

The DOC value was equal to 0.10%.

Test No 3.

This test illustrates the prior art.

The same calcium carbonate filter cake used in test no 2, but at 70% solids, was dispersed using 0.90% sodium polyacrylate (with a molecular weight Mw equal to 12'000 Dalton, measured by GPC), active content based on dry weight of mineral matter.

The obtained suspension had a Brookfield™ viscosity measured at 100 rpm above 1000 mPa·s The DOC value was equal to 0.26%.

Test No 4.

This test illustrates the prior art.

A calcium carbonate filter cake (Vermont, based marble), with a solids content of 61% by dry weight of mineral matter, and with the following granulometric characteristics (as measured by Sedigraph™ 5100):
  a medium diameter equal to 0.71 μm,
  90% by weight of the particles have a mean diameter lower than 2 μm,
  64% by weight of the particles have a mean diameter lower than 1 μm,
  7% by weight of the particles have a mean diameter lower than 0.2 μm, was dispersed using 0.70% (in dry weight of active additives by dry weight of mineral matter) of a sodium polyacrylate/sodium maleinate copolymer (with a molecular weight $M_w$ equal to 12'000 Dalton, measured by GPC, and a molar ratio of acrylic acid: maleic acid equal to 7:3), active content based on dry weight of mineral matter, and upconcentrated to 71.7% solids.

The obtained suspension had a Brookfield™ viscosity measured at 100 rpm equal to 230 mPa·s.

The obtained suspension was further upconcentrated to 73.1% solids by adding an additional 0.2% by weight of dry pigment for a total addition of 0.9% by weight of the same sodium polyacrylate/sodium maleinate copolymer.

The obtained suspension had a Brookfield™ viscosity measured at 100 rpm equal to 260 mPa·s.

A further upconcentration was not possible without using more than 1% of the same organic polymer by dry weight of mineral matter.

The DOC value was equal to 0.37%.

Test No 5.

This test illustrates the prior art.

1812 g of a calcium carbonate powder manufactured by OMYA™ under the name Hydrocarb™ 90-OG were suspended in 499 g of water.

The suspension exhibited a solids content of 78.3% (in dry weight of mineral matter) and a Brookfield™ viscosity equal to 605 mPa·s.

Test No 6.

This test illustrates the invention.

The same calcium carbonate filter cake used in test no 2 was dispersed using a combination of:
  0.26% of sodium polyacrylate (with a molecular weight $M_w$ equal to 12'000 Dalton, measured by GPC, as used in test 3), active content based on dry weight of mineral matter,
  0.258% in dry weight of active additive by dry weight of mineral matter, of an ammonium zirconium carbonate compound manufactured by MEL CHEMICALS™ in the name of Bacote™ 20.

The obtained suspension was then upconcentrated by means of a laboratory evaporator.

The final solids content of the carbonate slurry was equal to 75.5% by dry weight of mineral matter, and the Brookfield™ viscosity measured at 100 rpm was equal to 390 mPa·s. Even at such a high slurry solids content, the sodium polyacrylate content could be reduced by nearly one third to only 0.26% as compared to test 3.

The DOC value was equal to 0.075%. This value is lower than the ones obtained for tests no 2, 3 and 4: as such, the process according to the invention allows the skilled man in the art to significantly reduce the DOC value, even at a comparable or higher solids content.

Test No 7.

This test illustrates the invention.

The same calcium carbonate filter cake used in test no 2 was dispersed using a combination of:

0.26% of a sodium polyacrylate (with a molecular weight $M_w$ equal to 12'000 Dalton, measured by GPC, as used in test 3), active content based on dry weight of mineral matter 0.28% in dry weight of polymer by dry weight of mineral matter, of an potassium zirconium carbonate compound manufactured by MEL CHEMICALS™ in the name of Zirmel™ 1000.

The obtained slurry was then upconcentrated by the means of a laboratory evaporator.

The final solids content was equal to 72.6% by dry weight of mineral matter, and the Brookfield™ viscosity measured at 100 rpm was equal to 460 mPa·s.

The DOC value was equal to 0.075%. This value is lower than the ones obtained for tests no 2, 3 and 4: as such, the process according to the invention allows the skilled man in the art to significantly reduce the DOC value while using a different zircon compound as compared to test 6.

Test No 8.

This test illustrates the invention.

The same calcium carbonate filter cake used in test no 2, adjusted to a solids content of 53% by dry weight of mineral matter, was dispersed using a combination of:

0.34% sodium polyacrylate (with a molecular weight $M_w$ equal to 12'000 Dalton, measured by GPC, as used in test 3), active content based on dry 0.52% in dry weight of polymer by dry weight of mineral matter, of a potassium zirconium carbonate compound manufactured by MEL CHEMICALS™ in the name of Zirmel™ 1000.

The obtained slurry was then upconcentrated by the means of a laboratory evaporator.

The final solids content was equal to 74.1% by dry weight of mineral matter, and the Brookfield™ viscosity measured at 100 rpm was equal to 255 mPa·s.

The above results demonstrate that it is possible to disperse calcium carbonate according to the invention, by using a zirconium compound in combination with a polyacrylate dispersant, thus avoiding the use of phosphate dispersant.

Moreover, they demonstrate that it is possible to achieve a higher solids content relative to the prior art, and to maintain the stability of the obtained aqueous suspension in terms of Brookfield™ viscosity.

Finally, for a similar Brookfield™ viscosity and a higher solids content, the above results demonstrate that a process according to the invention allows the quantity of polyacrylate dispersants needed to be reduced.

The DOC value was equal to 0.075%. This value is lower than the ones obtained for tests no 2, 3 and 4: as such, the process according to the invention allows the skilled man in the art to significantly reduce the DOC value.

Test No 9.

This test illustrates the invention.

The same calcium carbonate filter cake used in test no 2, adjusted to a solids content of 20% by dry weight of mineral matter, was dispersed using a combination of:

0.34% of a sodium polyacrylate (with a molecular weight $M_w$ equal to 12'000 Dalton, measured by GPC, as used in test 3), active content based on dry, 0.52% in dry weight of polymer by dry weight of mineral matter, of an potassium zirconium carbonate compound manufactured by MEL CHEMICALS™ in the name of Zirmel™ 1000.

The obtained slurry was then upconcentrated by the means of a laboratory evaporator.

For the following solids contents, stable suspensions of calcium carbonate were obtained, exhibiting the following Brookfield™ viscosities:

at 69.6% solids content (in dry weight of mineral matter) a Brookfield™ viscosity of 395 mPa·s was obtained, at 71.7% solids content (in dry weight of mineral matter) a Brookfield™ viscosity of 480 mPa·s was obtained, at 75.1% solids content (in dry weight of mineral matter) a Brookfield™ viscosity of 800 mPa·s was obtained.

The above results demonstrate that a process using a zirconium compound according to the invention allows a calcium carbonate filter-cake of low solids content to be concentrated to a high solids content form.

Furthermore, the obtained suspensions according to the invention remain stable in terms of Brookfield™ viscosity.

The DOC value was equal to 0.11%. This value is lower than the ones obtained for tests no 2, 3 and 4: as such, the process according to the invention allows the skilled man in the art to significantly reduce the DOC value.

Test No 10.

This test illustrates the invention.

To 1981 g of the suspension of test 5, 0.084% (in dry weight of active additive by dry weight of mineral matter) Zirmel™ 1000, which is a potassium zirconium carbonate compound manufactured by MEL CHEMICALS™, was added.

The suspension of calcium carbonate obtained exhibited a solids content of 78.3% (in dry weight of mineral matter) and a Brookfield™ viscosity of 255 mPa·s.

To 1636 g of the suspension of 3D, 0.359% (in dry weight of active additive by dry weight of mineral matter) of Zirmel™ 1000, which is a potassium zirconium carbonate compound manufactured by MEL CHEMICALS™, was added.

A very stable suspension of calcium carbonate was obtained with a solids content of 78.3% (in dry weight of mineral matter) and a Brookfield™ viscosity of 215 mPa·s.

The above results demonstrate the dispersing action of AZC.

Example 3

This example illustrates the use of a zirconium compound in a process of manufacturing a calcium carbonate-containing slurry.

More precisely, it relates to the use of a zirconium compound in a process to grind a calcium carbonate.

Finally, it illustrates that the use of a zirconium compound as grinding aid and a dispersing aid agent, according to the invention, produces a high solids ground calcium carbonate suspension with good stability in terms of Brookfield™ viscosity.

Test No 11.

A calcium carbonate suspension of 56% in dry weight of mineral matter was ground in water, with the use of Zirmel™ 1000, which is a potassium zirconium carbonate compound manufactured by MEL CHEMICALS™.

The granulometry of the particles was then determined using a Sedigraph™ 5100 commercialized by MICROMERITICS™, and as a function of the amount of the zirconium compound used.

- when 0.38% (by dry weight of mineral matter) of Zirmel™ 1100 was used, 24% (in weight of mineral matter) of the particles had a mean diameter lower than 1 µm,
- when 0.69% (by dry weight of mineral matter) of Zirmel™ 1100 was used, 36% (in weight of mineral matter) of the particles had a mean diameter lower than 1 µm,
- when 1.28% (by dry weight of mineral matter) of Zirmel™ 1100 was used, 50% (in weight of mineral matter) of the particles had a mean diameter lower than 1 µm,
- when 3.80% (by dry weight of mineral matter) of Zirmel™ 1100 was used, 75% (in weight of mineral matter) of the particles had a mean diameter lower than 1 µm, The above results demonstrate that a process according to the invention allows the skilled man in the art to grind calcium carbonate in water to a desired level of fineness, without the use of phosphate or polyacrylate compounds.

Example 4

This example illustrates the use of a zirconium compound, in combination with polyacrylate-type dispersants, in a process of manufacturing a calcium carbonate-containing slurry, while avoiding the use of phosphate to support the dispersants.

More precisely, it relates to the use of a zirconium compound in combination with polyacrylate-type dispersants, in a process to disperse and upconcentrate calcium carbonate.

Finally, it illustrates that the use of the process according to the invention produces a stable calcium carbonate dispersion in terms of Brookfield™ viscosity, and allows the amount of polyacrylate dispersants needed for the viscosity to be reduced.

Test No 12.

This test illustrates the prior art.

1 m3 of a 72.6% solids slurry of calcium carbonate with the following granulometric characteristics (as measured by Sedigraph™ 5100):
- a medium diameter equal to 0.80 µm,
- 88% by weight of the particles have a mean diameter lower than 2 µm,
- 61% by weight of the particles have a mean diameter lower than 1 µm,
- 8% by weight of the particles have a mean diameter lower than 0.2 µm, was produced from an aqueous suspension of calcium carbonate with a solids content of 18.7% by dry weight of mineral matter by using 0.35% (in dry weight of active additives by dry weight of mineral matter) of a sodium polyacrylate/sodium phosphate based dispersing agent which is a blend of partially neutralized sodium polyacrylate (with a molecular weight $M_w$ equal to 12'000 Dalton, measured by GPC) and sodium phosphates, produced by mixing 40% sodium polyacrylate and 85% solid phosphoric acid in a ratio 2:1 in respect to active dry weight of each additive.

The suspension was produced by thermal upconcentrated by means of pilot evaporator.

The final solids content of the carbonate slurry was equal to 72.6% by dry weight of mineral matter, and the Brookfield™ viscosity measured at 100 rpm was equal to 200 mPa·s.

The DOC value was equal to 0.062%.

The content of tri sodium phosphate (Na3PO4) in the sample in respect to dry weight of mineral matter was 0.20%.

Test No 13.

This test illustrates the prior art.

1 m³ of high solids slurry of calcium carbonate with the following granulometric characteristics (as measured by Sedigraph™ 5100):
- a medium diameter equal to 0.61 µm,
- 94% by weight of the particles have a mean diameter lower than 2 µm,
- 73% by weight of the particles have a mean diameter lower than 1 µm,
- 14% by weight of the particles have a mean diameter lower than 0.2 µm, was produced from an aqueous suspension of calcium carbonate with a solids content of 18.7% by dry weight of mineral matter using 0.68% (in dry weight of active additives by dry weight of mineral matter) of a sodium polyacrylate/sodium phosphate based dispersing agent, which is a blend of partially neutralized sodium polyacrylate (with a molecular weight $M_w$ equal to 12'000 Dalton, measured by GPC) and sodium phosphates, produced by mixing 40% sodium polyacrylate and 85% solid phosphoric acid in a ratio 2:1 in respect to active dry weight of each additive.

The suspension was produced by thermal upconcentrated in a pilot evaporator.

The final solids content of the carbonate slurry was equal to 72.3% by dry weight of mineral matter, and the Brookfield™ viscosity measured at 100 rpm was equal to 248 mPa·s.

The DOC value was equal to 0.125%.

The content of tri sodium phosphate (Na3PO4) in the sample in respect to dry weight of mineral matter was 0.40%.

Test No 14.

This test illustrates the invention.

1 m³ of high solids slurry of calcium carbonate with the following granulometric characteristics (as measured by Sedigraph™ 5100):
- a medium diameter equal to 0.86 µm,
- 89% by weight of the particles have a mean diameter lower than 2 µm,
- 59% by weight of the particles have a mean diameter lower than 1 µm,
- 6% by weight of the particles have a mean diameter lower than 0.2 µm, was produced from an aqueous suspension of calcium carbonate with a solids content of 22.0% by dry weight of mineral matter using 0.22% (in dry weight of active additives by dry weight of mineral matter) of a sodium polyacrylate (with a molecular weight $M_w$ equal to 12'000 Dalton, measured by GPC) and 0.23% of Zirmel™ 1000, which is a potassium zirconium carbonate compound manufactured by MEL CHEMICALS™.

The suspension was thermal upconcentrated by means of a pilot evaporator.

The final solids content of the carbonate slurry was equal to 71.2% by dry weight of mineral matter, and the Brookfield™ viscosity measured at 100 rpm was equal to 440 mPa·s.

The DOC value was equal to 0.062%. The phosphate level in this example of the invention could be entirely eliminated compared to test no 12.

Test No 15.

This test illustrates the invention.

1 m³ of a high solids slurry of calcium carbonate with the following main granulometric characteristics (as measured by Sedigraph™ 5100):
- a medium diameter equal to 0.69 μm,
- 94% by weight of the particles have a mean diameter lower than 2 μm,
- 72% by weight of the particles have a mean diameter lower than 1 μm,
- 7% by weight of the particles have a mean diameter lower than 0.2 μm, was produced from an aqueous suspension of calcium carbonate with a solids content of 17.8% by dry weight of mineral matter using 0.28% (in dry weight of active additives by dry weight of mineral matter) of a sodium polyacrylate (with a molecular weight $M_w$ equal to 12'000 Dalton, measured by GPC) and 0.26% of Zirmel™ 1000 which is a potassium zirconium carbonate compound manufactured by MEL CHEMICALS™.

The suspension was thermal upconcentrated by means of pilot evaporator.

The final solids content of the carbonate slurry was equal to 71.2% by dry weight of mineral matter, and the Brookfield™ viscosity measured at 100 rpm was equal to 840 mPa·s.

After adding an additional 0.1% of Zirmel™, the Brookfield™ viscosity measured at 100 rpm was equal to 420 mPa·s.

The DOC value was equal to 0.081%.

The phosphate level in this example of the invention was entirely eliminated compared to test no 13.

By comparison with tests no 12 and 13, tests no 14 and 15 demonstrate that the use of a zirconium compound, in combination with polyacrylate, according to the invention, produces a stable aqueous dispersions of calcium carbonate in terms of the Brookfield™ viscosity, without the use of phosphate.

Example 5

This example illustrates the use of a zirconium compound, in a process of manufacturing a calcium carbonate-containing slurry, without the use of phosphate dispersants by adding the zirconium compound directly to a filter-cake of calcium carbonate.

In this example, the process according to the invention is also characterized in that a calcium carbonate in dry form is introduced during the stage of upconcentration.

Finally, this example also shows that a process according to the invention allows the skilled man in the art to disperse calcium carbonate in water in order to obtain a high solids content (higher than 70% in dry weight of mineral matter) and a good stability in terms of Brookfield™ viscosity.

Test No 16.

This test illustrates the invention.

450 g of a calcium carbonate filter-cake with a solids content of 65.5% (in dry weight of mineral matter) having the following main granulometric characteristics (as measured by Sedigraph™ 5100):
- 98% by weight of the particles have a mean diameter lower than 2 μm,
- 77% by weight of the particles have a mean diameter lower than 1 μm,
- 13.7% by weight of the particles have a mean diameter lower than 0.2 μm, and containing no other chemicals, were dispersed using 0.60% of Zirmel™ 1000, in dry weight of active additive by dry weight of mineral matter which is a potassium zirconium carbonate compound manufactured by MEL CHEMICALS™, and kneading.

Further more 0.03% (in dry weight of active additive by dry weight of mineral matter) of a polyacrylate-based dispersant manufactured by COATEX™ under the name Coatex™ GXN was added while stirring.

The obtained suspension was then upconcentrated by means of a laboratory evaporator, with a subsequent further addition of 0.10% (in dry weight of active additive by dry weight of mineral matter) of Bacote™ 20, which is an ammonium zirconium carbonate compound manufactured by MEL CHEMICALS™.

The final solids content was equal to 71.0% (in dry weight of mineral matter) and the slurry was stable exhibiting a Brookfield™ viscosity equal to 270 mPa·s.

The DOC value was equal to 0.009%. This value is significantly lower than that obtained for test no 13 which illustrates the prior art: the process according to the invention allows the skilled man in the art to significantly reduce the amount of polycarboxylate-based dispersants, thus reducing the DOC value.

Test No 17.

This test illustrates the invention.

967 g of a calcium carbonate filter-cake with a solids content of 65.5% having the following main granulometric characteristics (as measured by Sedigraph™ 5100):
- 98% by weight of the particles have a mean diameter lower than 2 μm,
- 77% by weight of the particles have a mean diameter lower than 1 μm,
- 13.7% by weight of the particles have a mean diameter lower than 0.2 μm, and containing no other chemicals, was fluidised by adding 0.60% of Bacote 20 (in dry weight of active additive by dry weight of mineral matter), which is an ammonia zirconium carbonate compound manufactured by MEL CHEMICALS™, and kneading.

Further 0.03% of Coatex™ GXN (in dry weight of active additive by dry weight of mineral matter), which is a polyacrylate-based dispersant manufactured by COATEX™ under the name Coatex™ GXN, was added while stirring.

The suspension exhibited a solids content of 65.0% (in dry weight of mineral matter) and was then upconcentrated by adding the same calcium carbonate in the form of a spray dried powder until a solids content of 71.2% was achieved.

After the addition of 0.60% (in dry weight of active additive by dry weight of mineral matter) of Bacote™ 20 and 0.03% (in dry weight of active additive by dry weight of mineral matter) of Coatex™ GXN, a stable suspension of calcium carbonate was obtained with a Brookfield™ viscosity equal to 280 mPa·s.

The DOC value was equal to 0.009%. This value is significantly lower than that obtained for test no 13 illustrating the prior art: the process according to the invention allows the skilled man in the art to significantly reduce the amount of polycarboxylate-based dispersants, thus reducing the DOC value.

Test No 18.

This test illustrates the invention.

964 g of a calcium carbonate filter-cake with a solids content of 65.5% having the following main granulometric characteristics (as measured by Sedigraph™ 5100):

98% by weight of the particles have a mean diameter lower than 2 µm,

77% by weight of the particles have a mean diameter lower than 1 µm, 13.7% by weight of the particles have a mean diameter lower than 0.2 µm, and containing no other chemicals, was fluidised by adding a blend of 0.30% of Bacote™ 20 (in dry weight of active additive by dry weight of mineral matter), which is an ammonia zirconium carbonate compound manufactured by MEL CHEMICALS™, and 0.30% of Zirmel™ 1000 (in dry weight of active additive by dry weight of mineral matter) which is a potassium zirconium carbonate compound manufactured by MEL CHEMICALS™, and kneading.

Further more 0.03% of Coatex™ GXN (in dry weight of active additive by dry weight of mineral matter) was added while stirring. The suspension exhibited a solids content of 65.5% (in dry weight of mineral matter) and was then upconcentrated by adding the same calcium carbonate in the form of a spray dried powder and in the presence of 0.03% of Coatex™ GXN (in dry weight of active additive by dry weight of mineral matter) until a solids content of 71.0% was achieved.

The DOC value was equal to 0.009%.

After the addition of a blend of 0.30% of Bacote™ 20, and 0.3% of Zirmel™ 1000, which is a potassium zirconium carbonate compound manufactured by MEL CHEMICALS™, and 0.03% of Coatex™ GXN, in dry weight of active additive by dry weight of added spray dried mineral powder, and adjusting the pH to 10 by the means of a solution of potassium hydroxide, a stable suspension of calcium carbonate was obtained with a Brookfield™ viscosity equal to 173 mPa·s.

The DOC value was equal to 0.017%. These DOC values are significantly lower than that obtained for test no 13 which illustrates the prior art: the process according to the invention allows the skilled man in the art to significantly reduce the amount of polycarboxylate-based dispersants, thus reducing the DOC value.

Furthermore, tests no 16 to 18 clearly demonstrate that the process according to the invention allows to manufacture a stable calcium carbonate-containing slurry, without the use of phosphate dispersants, by adding the zirconium compound directly to a filter-cake of calcium carbonate, then upconcentrating, and then adding calcium carbonate in a dry form.

Example 6

This example illustrates the use of calcium carbonate-containing slurry containing one or more zirconium compounds, and manufactured using the process according to the invention, in the production of coating colours which are further used to coat paper.

This example also illustrates papers according to the invention, having some of their optical properties enhanced by the use of a calcium carbonate-containing slurry containing one or more zirconium compounds according to the invention.

In this example, paper coating compositions were formulated, using various calcium carbonate slurries representing the prior art, and other representing the invention.

The composition of each coating colour was the following (expressed in terms of parts by weight of dry products):

| | |
|---|---|
| Calcium carbonate-containing slurry (calcium carbonate manufactured by OMYA ™): | 80 |
| Hydragloss ™ 90 (clay from HUBER ™): | 20 |
| Coatex ™ GXN (dispersant manufactured by COATEX ™): | 0.1 |
| DOW ™ Latex 966 (latex binder manufactured by DOW ™ CHEMICALS): | 11 |
| CMC Finnfix ™ 10 (carboxymethylcellulose manufactured by METSA SERLA ™): | 0.5 |
| PVA Mowiol ™ 6-98 (polyvinylalcohol manufactured by CLARIANT ™): | 0.4 |
| Blancophor ™ P (optical brightener manufactured by CIBA ™): | 0.6 |

The coating colours were compared following doubled-sided single coatings on a 58 g/m² wood-free base paper at a coater speed of 1'200 m/min; applied coat weights were 11.0 and 12.5 g/m.

The papers were calendered at line loads of 250 and 270 kN/m, at a temperature of 80° C. using a Voith™ Sulzer Supercalender with 11 Nips.

In all cases, opacity was measured using an Elephro™ 3000 according to DIN 53146

Test No 19.

This test illustrates the prior art and uses the calcium carbonate suspension obtained for test no 12.

The measured opacity following calendaring at 250 kN/m and normalised to 83 g/m2 was equal to 88.0%.

The measured opacity following calendaring at 270 kN/m and normalised to 83 g/m2 was equal to 87.8%.

Test No 20.

This test illustrates the prior art and uses the calcium carbonate suspension obtained for test no 13.

The measured opacity following calendaring at 250 kN/m and normalised to 83 g/m2 was equal to 88.0%.

The measured opacity following calendaring at 270 kN/m and normalised to 83 g/m2 was equal to 87.6%.

Test No 21.

This test illustrates the invention and uses the calcium carbonate suspension obtained for test no 14.

The measured opacity following calendaring at 250 kN/m and normalised to 83 g/m2 was equal to 88.2%.

The measured opacity following calendaring at 270 kN/m and normalised to 83 g/m2 was equal to 88.2%.

The above results indicate that paper containing aqueous dispersions according to the invention show equal to slightly improved opacity values.

Test No 22.

This test illustrates the invention and uses the calcium carbonate suspension obtained for test no 15.

The measured opacity following calendaring at 250 kN/m and normalised to 83 g/m2 was equal to 88.3%.

The measured opacity following calendaring at 270 kN/m and normalised to 83 g/m2 was equal to 87.8%.

The above results indicate that paper containing aqueous dispersions according to the invention show equal to slightly improved opacity values.

The invention claimed is:

1. An aqueous suspension and/or aqueous dispersion of calcium carbonate obtained by the process comprising the steps of (i) contacting calcium carbonate with a grinding and/or dispersing aid agent in water to obtain a calcium carbonate-containing slurry, wherein the grinding and/or dispersing aid agent comprises a zirconium compound selected from the group consisting of ammonium zirconium carbonate, potassium zirconium carbonate, and mixtures thereof, and (ii) grinding and/or dispersing the calcium carbonate-containing slurry to obtain an aqueous suspension and/or aqueous dispersion of calcium carbonate, wherein the aqueous suspension and/or aqueous dispersion of calcium carbonate so obtained consists of calcium carbonate, water, the zirconium compound and optionally one or more polyacrylates as a grinding and/or dispersing agent.

2. The aqueous suspension and/or aqueous dispersion according to claim 1, wherein grinding and/or dispersing aid agent is ammonium zirconium carbonate.

3. The aqueous suspension and/or aqueous dispersion according to claim 1, wherein the grinding and/or dispersing aid agent is potassium zirconium carbonate.

4. The aqueous suspension and/or aqueous dispersion according to claim 1, wherein the grinding and/or dispersing aid agent is supplied in a form of an aqueous solution and/or an aqueous suspension and/or an aqueous emulsion, containing from 0.01% to 10% by dry weight of the zirconium compound.

5. The aqueous suspension and/or aqueous dispersion according to claim 1, wherein the grinding and/or dispersing aid agent is supplied in a form of an aqueous solution and/or an aqueous suspension and/or an aqueous emulsion, containing from 0.03% to 5% by dry weight of the zirconium compound.

6. The aqueous suspension and/or aqueous dispersion according to claim 1, wherein the grinding and/or dispersing aid agent is supplied in a dry form.

7. The aqueous suspension and/or aqueous dispersion according to claim 1, wherein in step (i), calcium carbonate in a dry form and/or in a form of an aqueous dispersion or an aqueous suspension or an aqueous filtercake, is added to an aqueous suspension and/or an aqueous emulsion and/or an aqueous solution containing the grinding and/or dispersing aid agent to obtain the calcium carbonate-containing slurry.

8. The aqueous suspension and/or aqueous dispersion according to claim 1, wherein in step (i), the zirconium compound in a dry form and/or in a form of an aqueous suspension and/or an aqueous emulsion and/or an aqueous solution, is added to an aqueous dispersion or an aqueous suspension or an aqueous filtercake of calcium carbonate in water to obtain the calcium carbonate-containing slurry.

9. The aqueous suspension and/or aqueous dispersion according to claim 1, wherein in step (i), calcium carbonate in a form of a pigment cake is added to an aqueous suspension and/or an aqueous emulsion containing the zirconium compound to obtain the calcium carbonate-containing slurry.

10. The aqueous suspension and/or aqueous dispersion according to claim 1, wherein in step (i), the zirconium compound in a dry form and/or in a form of an aqueous suspension and/or an aqueous emulsion, is mixed with a pigment cake in water to obtain the calcium carbonate-containing slurry.

11. The aqueous suspension and/or aqueous dispersion according to claim 1, wherein the calcium carbonate-containing slurry comprises one or more polyacrylates as an additional dispersing and/or a grinding aid agent.

12. The aqueous suspension and/or aqueous dispersion according to claim 1, wherein the calcium carbonate-containing slurry does not include any dispersing aid agent or grinding aid agent other than the zirconium compound.

13. The aqueous suspension and/or aqueous dispersion according to claim 1, wherein the zirconium compound is a grinding aid agent and the calcium carbonate-containing slurry is ground in step (ii).

14. The aqueous suspension and/or aqueous dispersion according to claim 1, wherein the zirconium compound is a dispersing aid agent and the calcium carbonate-containing slurry is dispersed in step (ii).

15. The aqueous suspension and/or aqueous dispersion according to claim 1, comprising more than 45% in dry weight of calcium carbonate.

16. The aqueous suspension and/or aqueous dispersion according to claim 1, comprising more than 65% in dry weight of calcium carbonate.

17. The aqueous suspension and/or aqueous dispersion according to claim 1, comprising more than 78% in dry weight of calcium carbonate.

18. The aqueous suspension and/or aqueous dispersion according to claim 1, consisting of (i) calcium carbonate, (ii) ammonium zirconium carbonate, potassium zirconium carbonate, or mixtures thereof, and (iii) water.

19. The aqueous suspension and/or aqueous dispersion according to claim 1, consisting of (i) calcium carbonate, (ii) ammonium zirconium carbonate, potassium zirconium carbonate, or mixtures thereof, (iii) water, and (iv) one or more polyacrylates as a dispersing and/or a grinding aid agent.

20. A dry calcium carbonate mineral pigment obtained by drying the aqueous suspension and/or aqueous dispersion of calcium carbonate according to claim 1.

21. A paper, plastic or paint comprising the aqueous suspension and/or aqueous dispersion of calcium carbonate according to claim 1.

22. A paper, plastic or paint comprising the dry calcium carbonate mineral pigment according to claim 20.

* * * * *